(12) United States Patent
Tsing (10) Patent No.: US 7,174,839 B2
(45) Date of Patent: Feb. 13, 2007

(54) SEED PLANTING SYSTEM FOR MULTIPLE TYPES OF CROPS

(75) Inventor: Tun H. Tsing, Naples, FL (US)

(73) Assignee: Ben Tun Hsin Tseng, Naples, FL (US)

( * ) Notice: Subject to any disclaimer, the term of this patent is extended or adjusted under 35 U.S.C. 154(b) by 130 days.

(21) Appl. No.: 10/919,507

(22) Filed: Aug. 17, 2004

(65) Prior Publication Data

US 2006/0037520 A1 Feb. 23, 2006

(51) Int. Cl.
*A01C 7/00* (2006.01)
*A01C 9/00* (2006.01)

(52) U.S. Cl. ............. 111/179; 111/182; 111/900
(58) Field of Classification Search ........... 111/170, 111/177–185, 200, 900
See application file for complete search history.

(56) References Cited

U.S. PATENT DOCUMENTS

| | | | |
|---|---|---|---|
| 3,788,518 A | 1/1974 | Beebe | |
| 4,145,980 A | 3/1979 | Boots | |
| 4,306,509 A | 12/1981 | Hassan et al. | |
| 4,444,130 A | 4/1984 | Ray | |
| 4,449,642 A | 5/1984 | Dooley | |
| 4,533,066 A | 8/1985 | Holmes et al. | |
| 4,688,698 A | 8/1987 | Holland | |
| 4,703,704 A | 11/1987 | Mielke et al. | |
| 4,718,363 A | 1/1988 | Williames | |
| 5,058,766 A | 10/1991 | Deckler | |
| 5,170,909 A | 12/1992 | Lundie et al. | |
| 5,359,948 A | 11/1994 | Makkink | |
| 5,465,869 A | 11/1995 | Schleicher et al. | |
| 5,601,209 A | 2/1997 | Barsi et al. | |
| 6,109,193 A | 8/2000 | Crabb et al. | |
| 6,142,086 A | 11/2000 | Richard | |
| 6,516,733 B1 | 2/2003 | Sauder et al. | |
| 6,520,111 B2 | 2/2003 | Lang | |

*Primary Examiner*—Christopher J. Novosad
(74) *Attorney, Agent, or Firm*—Robert Stenzel (57) ABSTRACT

A highly efficient seed planting system and method for farmers with small acreages that allows quick changes in equipment to effect quick changes in planted seed patterns. The system includes a seed selector, a seed distributor, a planting member, a transport apparatus and a timing drive mechanism. Efficiency is provided by a number of features including easily changeable seed carrying drums each having different predetermined first seed patterns for different seeds that produce scaled second predetermined patterns in the ground, an easily changeable seed distribution arrangement, an easily changeable and variable seed supply, a simple vacuum/pressure producer, and a timing drive apparatus that synchronizes movement of the drums with the transport apparatus and allows easy changing of the seed spacing in each row.

22 Claims, 5 Drawing Sheets

SEED PLANTING SYSTEM FOR MULTIPLE TYPES OF CROPS

BACKGROUND OF THE INVENTION

1. Field of the Invention

The present inventions relate to a highly efficient seed planting system for farmers who plant multiple kinds of crops each with accurately spaced individual seeds arranged in a specific predetermined pattern in a seed receiving medium such as ground soil. The system is compact, easily changeable, mobile, simple, reliable, accurate, serviceable, flexible and comprises a method and apparatus including a seed selector, a seed distributor, a planting member, a transport apparatus and a timing mechanism.

2. Description of Objects and Related Art

For farmers with smaller acreages, being able to produce a maximum amount of different kinds of agricultural products efficiently in a minimum required growing acreage and at a very low total cost including labor, materials and investments in plant and equipment provides a clear advantage to growers and is their goal. To achieve those objectives requires simple, flexible, accurate, reliable and serviceable equipment and a method that delivers undamaged seeds in a predetermined pattern. This is especially true with regard to planting, where it all begins. Here timing of the planting is critical and with unpredictable weather and soil conditions, a grower of multiple types of plants must have flexible equipment that can be quickly readied for whatever crop is ready to plant.

Also, great flexibility of crop planting apparati and methods is required for growers planting many different types of crops where each crop has its own sizes and shapes of seeds and unique predetermined patterns of planting. Each crop has its own growing "window" that requires seeds be planted during specific soil and weather conditions that are generally unpredictable and require fast action on the part of the grower to work within the growing "windows".

Where a variety of crops are to be planted efficiently during each crop's different growing "window", flexibility and ability to change equipment rapidly and efficiently is critical for maximum yield and efficiencies of operation and hence to success for the grower. Flexibility requires a crop planting system that can be easily attached and transported behind a motive means such as a tractor or tiller and where the seed selector is easily and quickly changeable to accommodate seeds of different sizes and shapes and to be able to reliably, safely and efficiently plant undamaged seeds in specific predetermined patterns.

Flexibility also may encompass being able to plant different sized and shaped seeds for different crops at the same time; each in different patterns and to do it accurately and reliably. Accuracy of spacing and avoidance of missing seeds at each seed holding point is critical for maximum yield. Correct planting depth and the ability to include nutrients, insecticides, etc. is important to achieving optimum emergence and yield.

Efficiency derives from, among other things, the method of being able to consistently select a predetermined array of individual seeds from a seed supply hopper having loose seeds therein and plant the seed in an easily and quickly variable predetermined pattern, which pattern includes a spaced apart longitudinal relationship to other seeds along a row with precision and in lateral relationship to seeds in adjacent rows. Moreover all of the foregoing must be accurate regardless of the speed and direction of the planting apparatus.

Further, in planting a plurality of parallel rows at the same time, the spacing in each row should be in predetermined increments to achieve predetermined density for the type of crop being grown under different seasonal conditions and in the type of soil in which it is planted.

Patents exemplifying the prior art have been found which show certain individual aspects of the invention however none provide or suggest using these aspects in the efficient, inexpensive and flexible combination as set forth by the present invention. Thus, in the past, to the inventor's knowledge, there have been many approaches to planting seeds in spaced rows in the ground by means of purely mechanical devices as shown for example in U.S. Pat. Nos. 4,444,130, 4,533,066, 5,058,766 and 5,359,948 wherein each discloses generally selecting seeds by moving them under the action of gravity into pockets or recesses from which they are moved and dispensed into the ground. Each are complicated, relatively inflexible devices dedicated to a generally limited size of seed that would be difficult to quickly change to accommodate another size or another pattern of seeds. Moreover each appears to suffer from the possibility of seed damage such as shear and limited accuracy.

Other patents disclose the addition of vacuum to handle seeds. Examples of such as shown in U.S. Pat. Nos. 3,788,518; 4,145,980; 4,306,509; 4,449,642; 4,688,698; 4,703,704; 4,718,363; 5,170,909; 5,465,869; 5,601,209; 6,109,193; 6,142,086, 6,516,733 and 6,520,111 include discs, fingers or drums in which vacuum is used for attracting and holding seeds however these are complex, relatively inflexible or relate to tabletop and food applications and are expensive to operate and maintain while still not providing the many advantages of the present invention.

SUMMARY OF THE INVENTION

In a preferred embodiment, the inventions comprise an efficient, accurate and reliable seed planting components and their combination and method of operation in a seed planting system including a seed selector, a seed distributor, a planting member, a transport apparatus and a timing mechanism.

Efficiency is provided by a number of features including easily changeable seed carrying drums each having different predetermined first seed patterns for different seeds that produce scaled second predetermined patterns in the ground, an easily changeable seed distribution arrangement, an easily changeable and variable seed supply, a seed holding point comprising a long large hole and a short smaller hole, a simple vacuum/pressure producing means and a timing drive apparatus that synchronizes movement of the drums with the transport apparatus and allows easy changing of the seed spacing in each row of planted seeds.

The seed selector includes an easily and rapidly changeable selector member capable of sequentially selecting a first predetermined array of individual seeds of a predetermined type, size and shape from a plurality of seeds in a seed supply source. The selected first predetermined array of seeds is a generally scaled model of the second or final predetermined pattern of planted seeds. The seeds selected from the supply are held on the selector in the first scaled predetermined pattern and the thus held seeds are moved a predetermined distance to a seed distributor within which they are conveyed and deposited in a seed receiving medium such as ground soil in a scale of said first predetermined pattern.

The selector member is a continuous surface that preferentially takes the form of the outer surface of an easily replaceable cylinder such as a cylindrical drum having an interior vacuum and interior pressure source. The continuous surface of the selector member has seed holding points thereon which may include an opening such as a hole there through cooperating sequentially with the interior vacuum source and the interior pressure source.

In one embodiment applicable to farms where the seed receiving medium is ground soil, a transport apparatus carries and/or moves the seed selector and distributor over the ground soil or seed receiving medium. Movement of the transport apparatus causes rotation of the seed selector member through a drive/timing mechanism or arrangement cooperating with the transport apparatus and the selector to regulate the rate of seed selection and distribution spacing in each row so the seed pattern selected and planted is a scale of the other regardless of the speed of the transport apparatus.

The transport apparatus may take the form of a tractor where planting requires distribution of a large amount of seeds on a large farm or it may take the form of a small tiller for replacing hand labor to deposit seeds in a smaller space such as a yard garden. In any event, the rotation of the seed selector is indexed or keyed to its movement over the ground soil or planting medium.

Flexibility and efficiency in planting is provided by any one or a combination of features including, for example, easy changeability of the selector member where it is an easily changeable drum to allow quick change of seeds and seed planting patterns; a simple and easily adjustable vacuum and pressure source interior of the replaceable drum; an extremely simple, rugged and easily adjustable power and timing mechanism; a seed supply source chamber that may be easily varied in size to allow different seeds to be planted at the same time; a distribution arrangement that is flexible and adaptable to changing patterns and a seed supply arrangement that allows quick and total removal and recovery of seeds from the chamber when a quick seed change is desired.

More specifically, according to a preferred embodiment, the seed selector includes a case including therein the endless continuous surface in the form of a hollow rotating drum that effectively divides the case into first and second compartments. The first compartment functions as a seed supply chamber and the second serves as a seed release chamber. The hollow drum is closed on one end and open on the other. During installation the open end of the hollow rotating drum slides in through an opening in a case end wall and over a stationary, axially extending partition means whereby the partition divides the interior of the hollow drum generally into two longitudinally axially extending portions with generally airtight separation there between. An inner end of the partition is fixed to the case and the outer or free end of the partitions sealingly abuts the inner surface of the drum and the partition effects an airtight seal with the drum about its periphery as the drum rotates around it.

Support for the rotating drum is provided by bearings around the opening in the case and on the fixed wall of the case to which the partition is attached. A connector arrangement on said drum closed end wall and on an outer end of said fixed support allows quick disconnection and removal of the drum from said case. The means for driving the drum also allows quick disconnection and in one embodiment it takes the form of a pulley wheel mounted on the closed wall of the drum and cooperating with a belt driven off of the transport means.

In one embodiment the partition may have an opening with a fan mounted thereon to pull air from a vacuum portion of the divided drum space into the other pressure portion. With this arrangement, a vacuum is created on the side of the partition facing the seed supply chamber and a positive pressure is created in the side of the partition facing the seed release chamber. An adjustment device between each of the portions and ambient air allows simple and quick adjustment of vacuum and air pressure.

As the drum rotates over the area on the vacuum side or portion which is adjacent the seed supply, a predetermined number of individual seeds are attracted to each of an array or pattern of seed holding points on the outer surface of the endless surface or drum and carried to the positive pressure side or portion where they are blown off into the seed release chamber and on into a seed distributor portion of the system.

The drum, case and appurtenant portions serve as a seed selector device for selecting an array of individual seeds in a predetermined pattern determined by the location of the seed holding points on the surface of the drum. The predetermined pattern on the drum is a scale of the predetermined pattern to be planted in the ground and depends on the space each type of plant requires.

The seed supply chamber may have partitions generally perpendicular to the axis of the drum whereby different seeds within each partitioned area may be planted at the same time. Also, the seed supply chamber may be configured with a funnel arrangement and a movable bottom, said bottom being movable by an operator to allow quick removal and recovery of seeds for fast changes and cleaning.

It is an important feature of the invention that the seeds may be quickly added and removed from the seed supply area and that the endless or continuous surface portion of the seed selector may be quickly and easily changed or replaced to allow among other things, a change of seed types and/or seed patterns. This feature allows the user to very quickly and easily switch the seed size, shape, pattern, etc. as the user is working to meet planting requirements. Thus, where it is required or desired to quickly change seeds or patterns in a short period of time, different continuous surfaces on drums of the same diameter may be quickly exchanged in a process that an experienced user should be able to do in three to ten minutes depending on whether the seed supply has to be changed or partitions added. Other changes such as changing the number or spacing of rows and the furrow ploughs may take longer however they still may be done much quicker with the invention herein than with other known seed planting machines of which we are aware.

The seed holding points may be designed for specific seeds. Thus, for example, the size, number and shape of the holes and the area of the surface around the holding point may be varied. Under usual circumstances seeds are planted in long rows with the seeds in adjacent rows either next to each other or staggered hence the seed holding points are in laterally related circumferential rows and the seed holding points are generally regularly spaced around the drum circumference to provide the desired pitch between seeds in the ground soil. Each seed holding point on the outside drum surface is designed to attract, by means of vacuum on the inside of the drum, a predetermined seed or seeds from the seed supply chamber for each opening in the seed holding point on the continuous surface as it moves past the seed supply chamber. It is an important object of the invention that there will be a specified seed or seeds for every seed holding point opening every time.

The seed holding points in practice may include holes on the outer surface of the continuous surface, which holes are of a cross sectional area or diameter that is smaller than the smallest dimension of the seeds being used and of an extremely short length. Behind or below each of the very short holes in the outer continuous surface there is a much larger hole through the drum and communicating with the vacuum or pressure whereby with the vacuum for example, there is no pressure drop though the short surface hole thereby eliminating clogging of the hole by bits of seed or residue and assuring total seed coverage. Although circular holes with diameters are easily produced by drilling and hence are shown in the preferred embodiment, any means of producing the holes are contemplated as are various shaped holes contemplated whereby for example, they may be formed by lasers to match specific seed profiles.

After the seed is carried by the holding point on the moving continuous surface a generally predetermined distance to the pressure side of the partition, it is blown off the continuous drum surface into the seed release chamber. Each seed then moves through the distributor portion of the system to a point from which the seeds are deposited into a predetermined arrangement in the ground soil or planting medium. The distributor portion may include conduits leading from the seed release chamber to a ground depositing.

The seed holding drum continuous surface has an inner end and an outer end and inner and outer endless surfaces. In practice we have found that smooth rotational movement of the drum may be effected by allowing the inner surface of the inner drum end to roll on inner bearings supported on the same side of the rectangular case where the end of the partition plate is fixed and supported. The outer end of the drum may have a drive means such as a pulley wheel attached thereto on the outside surface whereby a drive arrangement, such as a belt driven off the tractor wheel, may be used to cause the drum to rotate. The outer end of the drum is also supported by outer bearings mounted on the outer side of the rectangular case. In practice we have found that three bearings preferably arranged around the circumference of the drum may be advantageously used at each inner and outer end.

In practice in South Florida we have found that to raise 15 to 20 different crops of vegetables in growing seasons that range from around 30 to 70 days year round, we plant different crops very frequently, hence flexibility is crucial. For vegetables alone we use about six to eight different drums each with different sized holes and hole spacing. With the drums rotating on a fixed support, the simple means of connecting the drum to the support allows the necessary very rapid change.

Planting members include drags or tillers pulled behind a transport member and modified to have the seed distributor drop the selected seeds at predetermined spacing behind the implement that creates the furrow and ahead of the device that covers it over with ground soil.

DETAILED DESCRIPTION OF THE INVENTION

Figure 1:
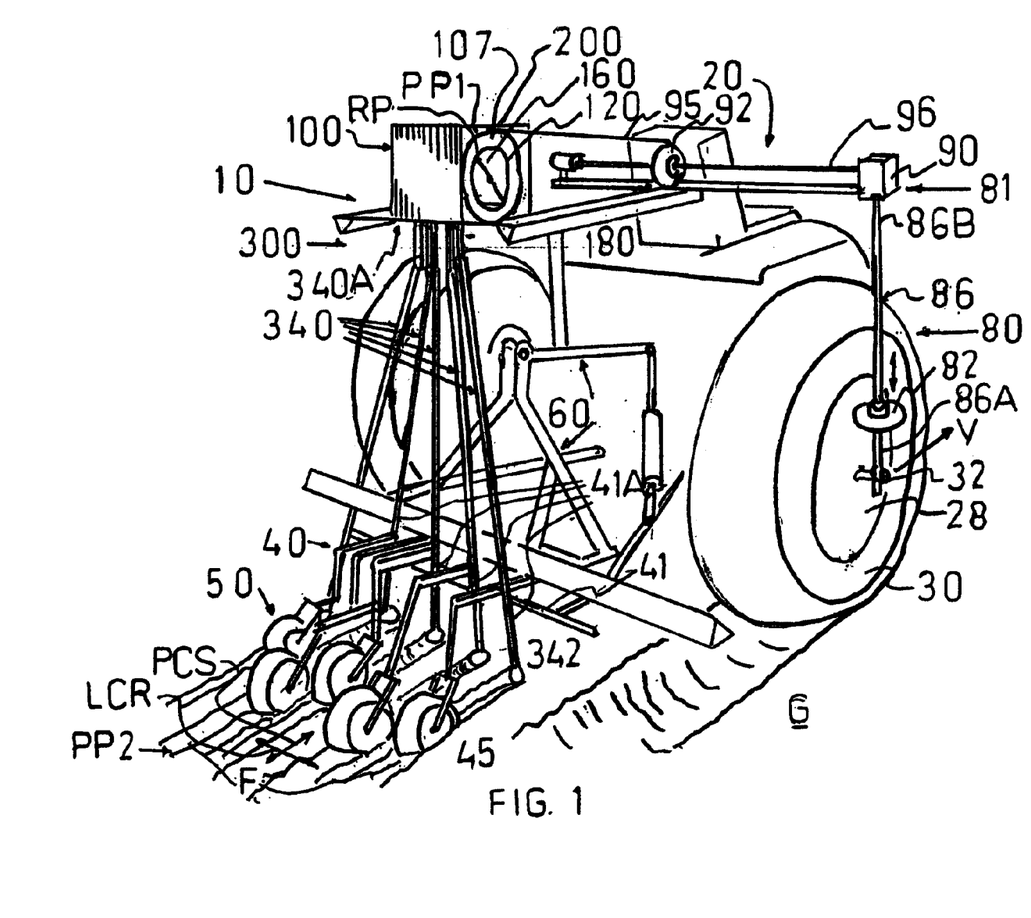
FIG. 1 is a perspective view of a first embodiment of the seed planting system of the invention shown as made of clear plastic and seen attached to the rear of a transport apparatus such as a tractor.

FIG. 1 is a perspective view of a first embodiment of the seed planting system of the invention generally indicated at 10 carried by a transport apparatus generally indicated at 20, which transport apparatus is adapted to move the system 10 at any appropriate planting speed velocity V across a planting medium such as ground soil G. The transport apparatus 20 may be a tractor that also is adapted to carry a planting member generally indicated at 40 for creating seed receiving furrows F in the ground soil G and restoring or seed covering means 50 or 250 to refill or cover the furrows F with ground soil.

The planting member 40 is connected to the transport apparatus 20 via a linkage arrangement schematically indicated at 60 which linkage allows the planting member 40 to be moved down and up into and out of engagement with the ground soil G as is common.

A power and timing mechanism generally indicated at 80 cooperates with a speed variable portion such as a wheel 30 of transport apparatus 20 to provide power and timing to a seed selector generally indicated at 100, which seed selector 100 is an important part of the seed planting system 10. As shown in enlarged detail in FIGS. 2–6, the seed selector 100 includes a continuous surface such as an outer surface 122 of a drum 120 located in a case generally indicated at 200. The seed selector case is shown as advantageously made of clear plastic.

The seed selector 100, with appurtenant portions, serves to select an array of individual seeds S in a first predetermined pattern PP1 which pattern is determined by the location of seed holding points generally indicated at 140 on the surface 122 of the drum. The first predetermined pattern PP1 on the drum surface 122 is a scale of the second predetermined pattern to be planted PP2 in the seed receiving medium or ground G and is determined by calculations of the spacing required for each type of plant or growing condition that the user expects to encounter.

As shown in FIGS. 1–3, 5 and 7, the drum 120 is rotated by means of a power source which is shown to be a pulley 107 and belt 95 connected through a pulley 92 and shaft 96 to a timing arrangement 80 to the transport apparatus 20, here shown as a tractor wheel 28 or another part of the tractor's transmission. This allows the drum 120 to turn at a rate proportional to the speed V of advance of the tractor. Because the drum speed determines the seeding rate, the seeds are distributed to the ground at even spacing, even when the speed of the tractor varies for any reason.

The drum 120 is located in case 200 in such a way as to divide the case 200 into a separate seed supply chamber 220 and a seed release chamber 310.

The seed selector drum 120 is rotatably mounted on a support partition 125 fixed to case 200 which support 125 divides the interior of the drum 120 into an inner vacuum chamber or vacuum source 160 and a pressure chamber or pressure source generally indicated at 180. As the drum 120 rotates in response to the drive 80, the drum 120 communicates sequentially through openings 142 in drum 120 with seed holding or pick up points 140 located on the continuous outer drum surface 122. The vacuum source is located adjacent the seed supply chamber 220 and the pressure source is located adjacent the seed release chamber 310.

The pick up points 140 are arranged in a first predetermined pattern or array PP1 so that as the drum is rotated past the seed supply pick up area SSPA the seed holding or pick up points 140 attract and pick up seeds S from the seed supply SS. By means of the vacuum source 160 the seeds S are sequentially removed by and held on continuous surface 122 in the first predetermined pattern PP1 by the plurality of seed holding points 140 which are in communication with the vacuum source 160. The seeds S are sequentially held by the vacuum in the first predetermined pattern PP1 on drum surface 122 while being moved a predetermined distance to a release point RP sequentially in the pattern PP1 at which release point RP the seeds S are sequentially released when the holding points 140 leave the vacuum source 160 and come into communication with the pressure source 180.

A seed distributor arrangement generally indicated at 300, best seen in FIG. 1, cooperates with the selector 100 to sequentially receive seeds S sequentially released at the release point RP in the first predetermined pattern PP1 and move them sequentially through a channel 345 to a point where they are planted by the planting mechanism 40 in the ground soil G in the second predetermined pattern PP2, which pattern PP2 is a scaled version of the first predetermined pattern PP1. In certain cases, such as where the seed selector is a wide drum 420 as shown in FIG. 8A, the scale of PP1 may be close to the actual scale of the plantings PP2, however in other cases the scale PP1 will be smaller than the scale PP2 as planted in the planting medium G.

Figures 2, 2A, 2B, 2C, 2D:
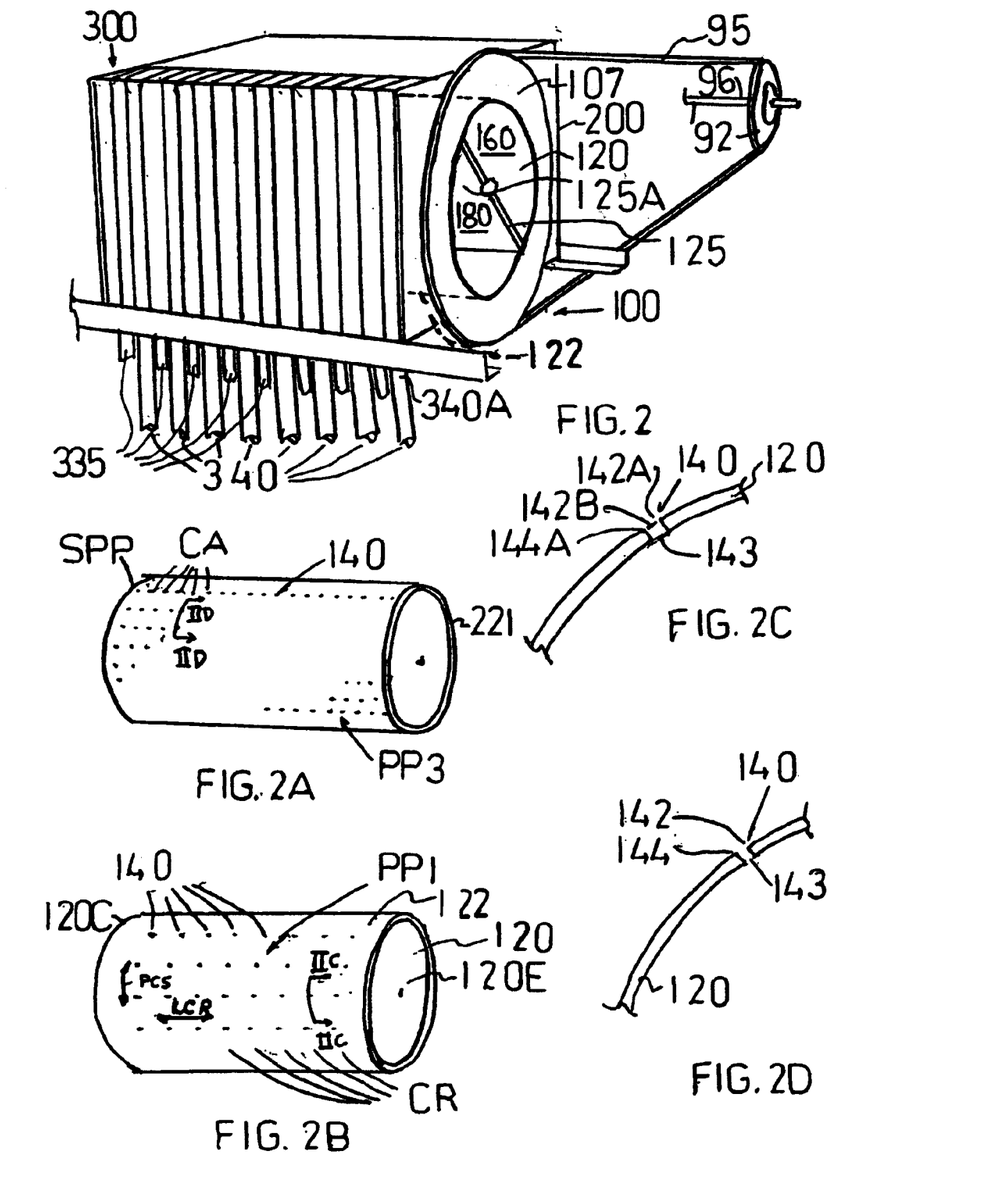
FIG. 2 is an enlarged perspective view of the seed selector portion of the seed planting invention of FIG. 1.
FIG. 2A is a perspective view of one embodiment of a predetermined pattern on the outer continuous surface of the drum that may be used in the seed selector of FIGS. 1 and. 2.
FIG. 2B is a perspective view of another embodiment of a predetermined pattern on the outer continuous surface of the drum that may be used in the seed selector of FIGS. 1 and 2.
FIG. 2C is an enlarged schematic cross-sectional view of a first embodiment of a seed pick up point taken along lines IIC—IIC of FIG. 2B.
FIG. 2D is an enlarged schematic cross-sectional view of a second embodiment of a seed holding point taken along lines IID—IID of FIG. 2A.
Figures 3, 3A, 4, 5, 6:
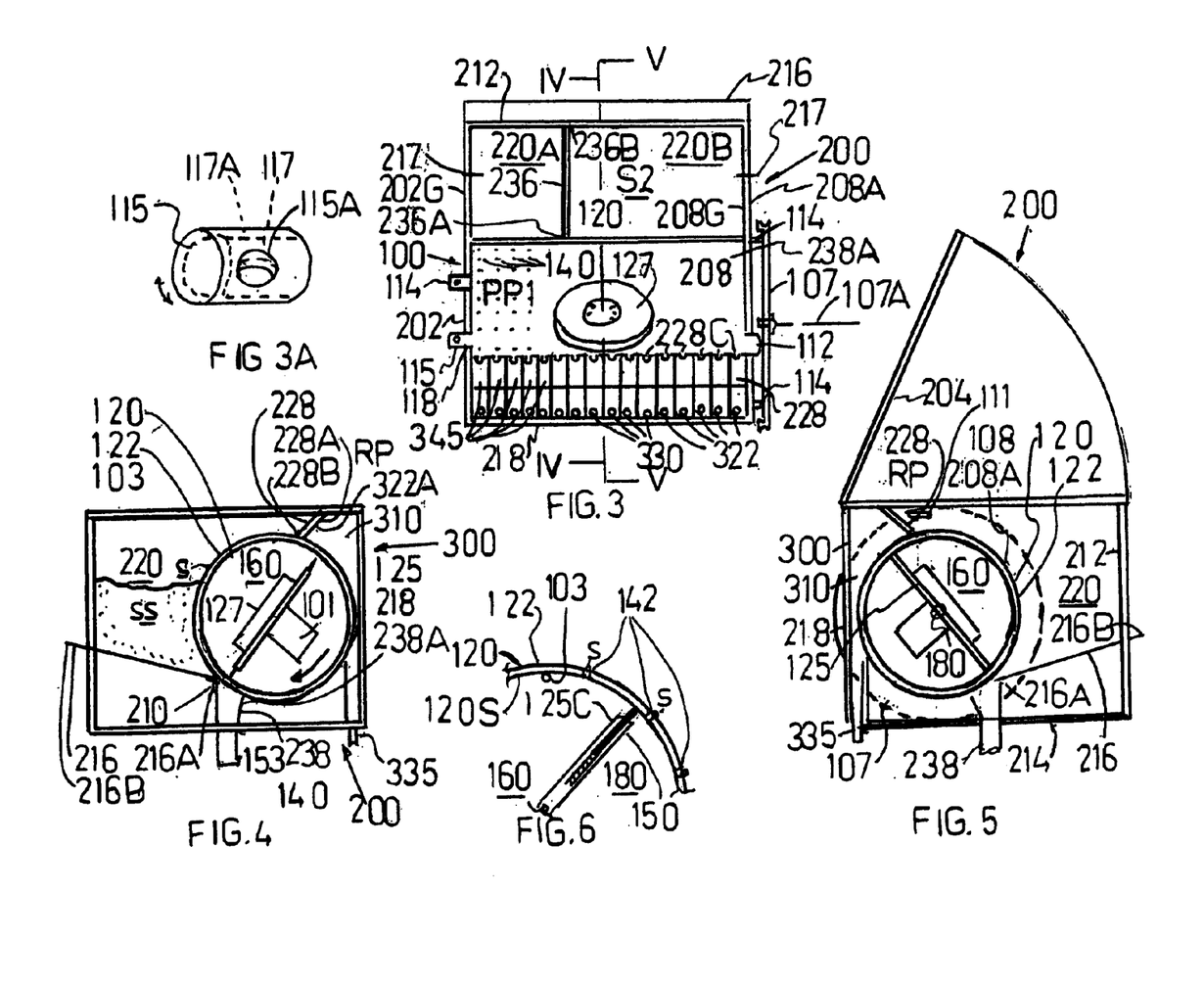
FIG. 3 is a top view of the seed selector invention of FIG. 1.
FIG. 4 shows a sectional view taken along line IV—IV of FIG. 3 showing the seed in the seed supply chamber.
FIG. 5 shows a sectional view taken along line V—V of FIG. 1 showing the seed supply chamber without seeds.
FIG. 6 is an enlarged view of the seal around the edges of the partition plate edge contacting the inner surface of the seed selector drum of FIG. 3.

The pick up points 140 in one embodiment of the invention shown in FIGS. 2C, 2D and 6 comprise first surface holes or openings identified at 142 of a size, number and shape required for the specific seeds to be handled by the selector drum 120 to achieve the predetermined pattern chosen. The holes 142 are of a very short axial length and lead to a second, significantly larger hole 143 of larger axial length which extends through the remaining thickness of drum 120 at generally right angles to the outer surface 122 thereof. In practice I have discovered that it is advantageous to make the larger holes 143 extend entirely though the drum 120 and then close the end of second opening 143 on the outer surface 122 with a very thin disc 144 of strong, very thin material that preferably has a first hole 142 therein of the desired size, number and shape, which hole 142 is significantly smaller than the second hole 143. Simply put, the first surface opening hole is relatively small to hold the desired seed or seeds and of relatively very short axial length while the opening second portion hole is significantly larger and of a relatively longer length. The larger second hole 143 allows any bits and particles that may be in with the seeds to more easily pass through more easily and not clog first hole 142 than would be the case if hole 143 were the same size as hole 142. The larger hole 143 also allows substantially the full vacuum or pressure inside the drum 120 to be more fully available at the first opening or hole 142. This design significantly increases efficiency by increasing reliability and reducing maintenance.

By way of example, the thickness of the material of which drum 120 is made may be in the order of 0.25 inches whereas the thickness of the disc 144 may be 0.01 mm. Thus, in practice when planting mustard seeds for example, the first hole 142 will be in the order of one millimeter in diameter while the second hole 143 will be more in the order of 3/16th inch in diameter. The holes need not necessarily be round with a diameter however that term is used to more easily compare area concepts and because seeds are usually round. Square holes are not as effective. The discs 144 may be affixed to the drum outer surface 122 by suitable means such an adhesive. Importantly the method of manufacture achieves efficiency and low costs by allowing production of generic drums with standard large holes 143 that may then be easily customized by adding premanufactured closures 144 with whatever hole size 142 may be required. The closures 144 may be made with or without holes to provide even greater flexibility in customization.

This hole configuration and the manufacturing process which makes it possible is critically important to users who may wish to be able to customize the drums to plant different seeds at the same time for various reasons. For example, I have found it is advantageous to plant different rows of seeds for plants that will be ready for harvest at different times or to plant alternate rows of plants that offer protection from certain insects, animals or organisms. Thus, we have found that certain plants effectively repell or discourage certain insects and in such case a row of this insect discouraging plant between others more attractive to insects will discourage the insects. Also, being able to relatively quickly change the hole configuration provides many benefits to smaller farmers as will be understood.

The construction of case 200, as shown in FIGS. 3–5, includes a number of features that increase flexibility and minimize costs. Important among these is a removable tray 216; a hinged funnel arrangement 238 as well as the easily compartmented seed supply area 220 as will become apparent. Basically, the case 200 includes a first sidewall 202 generally parallel with and spaced from a second sidewall 208. A first end wall 212 is generally parallel to a second end wall 218 and both intersect and are joined with the first and second sidewalls 202, 208 respectively to form the four sided case 200. A cover 204, shown in a raised position for illustration purposes, and bottom panel portion 214 complete the case enclosure 200 which enclosure receives the drum 120 therein.

The seed supply chamber 220 is bounded by a portion of first and second sidewalls 202, 208 on its sides, a portion of first end wall 212 on a third end side, a portion of cover 204 on top, the drum 120 on the side opposite the first end wall 212, a partition 228 above the drum 120 and a seed-pickup or bottom plate 216 on the bottom.

In the embodiment shown in FIGS. 2–6, the seed pick-up plate 216 is a planar, moveable plate having a first edge 216A adapted to substantially abut the outer surface 122 along the length of the drum 120 and slope slightly upwardly away from the drum 120. The slope allows the seeds S in the seed supply chamber to slide easily downwardly as the supply of seeds S is diminished from the withdrawal of seeds S by the continuous surface 122 of drum 120.

One way of assembling the seed selector case 200 may be to at least partially insert the plate 216 into parallel grooves 202G and 208G cut at the appropriate slope into the inside surfaces 202A and 208A of sides 202 and 208 of the case 200. As may be seen in FIG. 3 the plate 216 may be suitably held in guides such as grooves 202G and 208G by means such as removable pins 217 that act to prevent the plate 216 from sliding along the grooves against the drum 120 when in place, but which pins 217 may be removed to permit easy removal of the plate 216.

As may be best seen in FIG. 4, the first edge 216A of plate 216 adjacent drum 120 has a hinge arrangement 210 attaching the seed pickup plate 216 to a depending funnel structure 238. Again, as shown, the case 200 may be made of clear plastic material and in practice a thickness of about one-quarter inch has been advantageous.

It is an advantageous feature of the invention that when a seed change or cleaning is desired or required for any reason, a user can quickly empty the seed supply compartment 220 of any unused seeds S and recover them without detaching the case 200. Thus, to remove the seeds, the user disengages the securing means 217, grasps the plate 216 adjacent a second edge 216B and pulls the plate 216 away from the drum 120 to allow the seeds S to slide down the slope of plate 216 and fall over the first edge 216A and hinge area 210 and into the funnel 238 from which the seeds may be returned to a seed container. In practice we have found it advantageous to taper funnel 238 from a wide top 238A (running the length of the drum) to a narrow bottom not shown to facilitate collection when a single type of seed is in compartment 220. Funnel 238 is held in place by the hinges 210 in addition to suitable means not shown, but which may be similar to securing means 217. The funnel 238 may have suitable extensions not shown for directing seeds to containers in which the seed S was originally received.

Seed supply chamber 220 may be further divided along the axial length of drum surface 120 for example into first and second compartments 220A and 220B respectively as shown in FIG. 3 by a partition or partitions 236, typically removable, situated perpendicularly to the axis of drum 120 and extending from an inner end portion 236A curved to match and be contiguous to the continuous outer surface 122 to an outer end portion 236B attached to first end wall 212. There may be any number of partitions 236 placed at various locations along the width of the compartment 220 to divide it into any number of different sizes to accommodate different seeds and seed patterns. The partitions 236 may be installed to be easily removable so that as seed requirements change, the number and placement of the partitions 236 may be easily changed. One such installation uses predetermined grooves in the plate 216. The plurality of partitions 236 dividing up the width of seed supply chamber 220 allow the user to plant rows of different seed types at the same time.

To accommodate emptying and recovery of seeds in situations in which a plurality of different types of seeds may be used at the same time, a plurality of smaller funnels not shown, but similar to funnel 238, may be used between each set of possible partitions 236. Any funnel 238 or similar may have suitable extensions for directing seed to original seed containers. As with the seed selector 100, we have also found it advantageous to make the funnel from clear plastic material.

Seeds vary by size and shape and hence the size of first opening 142 of seed holding point 140 generally must be smaller than the smallest dimension of the seed S so that it is not sucked through the hole into the vacuum source 160, but merely held against the opening 142.

Vegetable seeds may be broadly categorized as; "big"; e.g. watercress is 5 mm round; "small round" e.g. cabbage, Chinese leak, and eggplant are 3 mm; "small flat" e.g. lettuce is 1 mm by 3 mm; "super small" e.g. mustard is 1 mm round. Based on the mustard seed example of approximately one mm round, the diameter of opening 142 would be in the order of half a mm; for a water cress seed, which is round and about five(5) mm in diameter, the opening diameter would be in the order of two(2) millimeters whereas for lettuce seeds, which are flat and elongated approximately one by one by three millimeters, the opening diameter would be in the order of half a millimeter. It has been found in some cases that a set of two or more holes such as shown in FIG. 2C may be arranged so that a single seed is held by the set of holes. Thus, for example, with non round seeds such as elongated lettuce seeds, it has been found that providing each holding point 140 with a set of more than one hole 142A, 142B as shown in FIG. 2C, (each in the order of a half mm for lettuce seeds) will provide a secure hold on the seed. The specific hole diameters and arrangements for each seed may be empirically determined for best results. Another instance where each seed holding point 140 may include a set of more than one hole is where it is desired to have each holding point 140 hold more than one seed. Thus, where the germination percentages of the seed type or lot are significantly less than 100%, as for example in the order of 50% for some reason, it may be cost effective in order to achieve 100% germination, to have two holes at each seed holding point 140 thereby planting two seeds together to increase the likelihood of achieving 100% germination at each seed point. Thus, I have found it to be easier and much more efficient to simply remove any extra plants caused by more than 50% germination than to attempt to transplant new plants after germination. Moreover, transplanting may damage plants and requires time and skilled help hence double seeding is more cost effective.

Being able to have drums 120 of the same diameter, but with different arrays and patterns of seed holding points and/or holes of different size or configuration ready to use for each crop of a different size and shape of seed and a different pattern for each season or growing condition for each and to be able to quickly change these different drums as required for each planting during a day greatly enhances the growers efficiency.

Different drums with different seed patterns and/or holding arrangements may be required for the same crop planted in different growing seasons since the "growing space" required for each plant will be different. Each type of plant requires a certain area of ground in which to best grow. This area will vary not only with the type of plant, but also with the ground soil or growing medium qualities, the location conditions and the expected weather conditions. It is the goal to have a plant in the center of its most efficient "growing space" to obtain maximum yield. This invention allows the grower to achieve this goal precisely and efficiently. Also, when seeds having different growing cycles are planted at the same time proper accommodation must be made.

To accommodate each type of seeds S whose full grown plants must be spaced apart laterally LCR and longitudinally PCS at predetermined distances or pitch for optimum results, the drum 120 has seed holding points 140 in a predetermined pattern PP for that specific type of seed in a specific growing area. When it is desired to plant specific predetermined patterns SPP of specific types of seeds S, a drum, a shown for example in FIG. 2A–D, is specifically designed and made for those conditions with the seed holding points 140 in that desired pattern SPP and with the proper sized hole 142 or holes 142A, 142B at each seed holding point 140 for the specific type of seeds required.

Thus, for example, comparing FIGS. 2A and 2B, it will be noted that a drum 221 has a greater number of seed holding points 140 in each circumferential row CR, a greater number of circumferential rows CR along the length of drum 221, and a lesser number of openings or holes 142 at each point 140 than the drum 120 of FIG. 2B. Each is designed for a specific crop and seed spacing to provide maximum production for a given area of soil and each may be easily and quickly substituted for the other as and when required.

It has been found cost effective in the manufacture and sale of the drum to produce what may be referred to as generic drums having a full pattern of open holes such as holes 143 in various center to center lateral row and circumferential seed spacing and in such cases allow the user to close various of the holes 143 with hole modification members 144 therein to achieve the desired SPP. The hole modification members 144 may be premanufactured with specific sized holes therein or the holes may be added after installation. Alternatively various generic drums are made with different sized holes and spacing for seeds of different types and sizes. It has been found that having all drums 120, 420 of the same diameter and length whereby they are fully interchangeable works very well.

To allow planting of different crops having different kinds of seeds that may be larger or smaller or of different shapes, the drum 120 itself is easily removable and can be replaced with other drums or surfaces which have larger or smaller or differently configured seed holding points 140 in patterns or arrays of predetermined spacing optimum for the different crops. The theoretical size of the drums may vary depending on the transport means, seeds to be planted and other variables however in practice I have found that a diameter in the order of about 6 to 12 inches and a length of about 24 to 48 inches works well for my purposes. Spacing of seed pick up points 140 may range from about ½ to 2 inch pitch to about a ½ to 3 inches laterally between circumferential rows CR.

From experience with vegetables in South Florida about 5 or 6 different drums should meet the requirements of 15 to 20 different crops planted during growing seasons that range from about 30 to 70 days. Each drum is the same diameter, hence replacement involves simply emptying the seed supply 220, removing the drum drive such as pulley 95, undoing the connector 125A, removing the drum 120 and replacing it with the new drum of the same diameter and length, reattaching the connector 125A and drum drive 95 and refilling the seed supply 220 with the new seeds. Where row spacing is changed, the outlet ends 340B of conduits 340 will be moved laterally to be placed with different as required.

Referring to FIGS. 2A and 3, it will be understood that to accommodate the various sizes, shapes and spacing of different seeds and patterns of seeds S, the drum 120 has circumferential rows CR of seed holding points 140 therein and each circumferential row CR is spaced to be between a potential partition 131A and 238 and the sidewalls of case 200. Again, in practice, with our current tractor transport, we typically have about 8 to 32 circumferential rows CR.

As may be best seen in FIG. 4, an axially extending partition 228 may be provided to serve as a reinforcement or structural portion of case 200 and may, to a certain extent, also function as a boundary between the seed supply chamber 220 and the seed release chamber 310. The axially extending partition 228 is attached on a first side 228A to an upper edge 322A of each of a plurality of release chamber partitions 322 and may serve to stabilize the partitions 322. An edge 228 B may be adjacent the outer surface 122 of the drum 120 and, depending on its proximity, may or may not include cut out portions 228C at points along the surface 122 where the seed holding points 140 are located. From FIGS. 3–6 it will be seen that seed release chamber 310 is bounded by top 204, end wall 218, and a plurality of partitions 322 of the distribution chamber 310. Distribution of the seeds S begins in the release chamber 310 where partition plates 322 receive and guide the seeds S into a number of narrow seed outlet passages 330 corresponding to the maximum number of rows of seeds in the first predetermined pattern PP1 which, as shown in the embodiments of FIGS. 1–3 and 8, comprises sixteen rows of seed holding points 140. These dividing partitions 322 are generally planar and parallel to each other and are perpendicular to the partition 208 which bound the release chamber 310. Without these partitions 322, certain seed outlet passages 330 may get multiple seeds S at a time while other seed outlet passages 330 get none due to the direction in which a seed S may leave the seed holding point 140 when it reaches the seed release chamber 310. These partitions 322 force seeds S from a particular ring of seed holding points 140 to fall through a corresponding seed outlet passage 330 of the distributor.

Again, the partitions 322 advantageously are thin so as not to block seeds and may be made from the same material as the case 200. The dividing partitions 322 are made of thin material to provide minimum obstruction to the seeds and maximum flexibility of spacing and may be stabilized as necessary by means such as for example the partition 228 and sidewall 208. This partition 228 may also be made from the same material used to make the case 200.

Distribution chamber 310 of the seed distributor 300 guides seeds S into the seed distribution conduits 340 after they are released from the seed holding points 140 on the continuous surface 122. In the example shown in FIG. 3, each of the circumferential rings or rows CR of seed holding points 140 in the continuous surface 122 is generally aligned with and corresponds to a distribution channel 345 that includes seed outlet passage 330. In practice we have found that the distribution channels 345 advantageously include conduit tubes 340 having an inlet end 340A attached to a funnel shaped fitting 335 at the point the seed enters and an outlet end 340B held by an outlet fitting 342 holding the outlet end 340B at the rear of a furrow producing means such as a probe 45. These seed outlet fittings and passages 335 may be made of suitable material to which seeds will not stick and are advantageously inserted into flexible tubes or conduits 340 through which seeds S slide and fall out of exit end 340B where they are distributed into the ground soil G by furrow producing portions or probes 45 of a planting mechanism 40. Probes 45 not only create a furrow into which the seed falls, but they keep dirt out of the exit or outlet end 340B. Conduit 340 may be made of suitable material including plastic or metal or a combination thereof.

An advantage of the having the tubes or conduits 340 be flexible plastic tubes is that they allow the user to easily and quickly attach and bend them to vary the distance between rows of seeds by attaching the inlet ends 340A to fittings 335 as required and/or moving or attaching the outlet end 340B among the various furrow producing portions 45 that may be attached to and along a primary spacing bar 41. The distance between rows produced by probes 45 may be easily facilitated and determined by moving the probes 45 to integral markings or calibrating points 41A on bar 41 shown in FIG. 1. In the embodiment shown in FIG. 7 the ends 340B may be attached to probes 45 through predetermined openings 350 located above where the probes 45 may be located below.

Great planting flexibility is shown by the fact that there are many distribution channels 345 to choose among. Thus, for purposes of illustration the described embodiment of the distributor shown in FIGS. 1, 2, 3 and 8 is shown to have 16 possible distribution channels 345, although any number may be used. Channels 345 effectively begin adjacent release point RP and include the passages between plates 322, outlet passages 330, fittings 335 and the conduits 340. Again, for illustration purposes, sometimes only a fraction of the available channels, say 8, 4 or even 1, will be needed depending on the size of the crop or crops being planted. To make this point, FIG. 1 shows only 4 of 16 channels in use and FIGS. 2, 7 and 8 each show 8 of 16 channels in use. Each active channel 345 is fed with a circumferential row CR of seed holding points 140 on drum 120 aligned to feed seeds S into it, hence, the number of channels 345 will equal at least the number of active rows CR in use. If all of the channels on drum 221 of FIG. 2A with its 20 rows CR are to be used it will be understood that the distribution system will require at least 20 channels.

Drum 120 has an open end 120E and a closed end 120C. The closed end 120C has a pulley 107 connected therewith. There are three inner bearings 103 rotatably supported on the first end wall 202 of case 200 as shown in FIG. 4. On the opposite end wall 208, there is a circular hole 208A to allow drum 120 to slide into or out of case 200. Along the circular opening 208A, there are three rotatably mounted outer bearings 108 as shown in FIG. 5 contacting and supporting the drum continuous outer surface 122 on the pulley end. Referring to FIG. 3, the drum 120 is suitably and securely attached to the pulley 107 by means such as fasteners generally indicated at 114 allowing no relative movement of one to the other. Pulley 107 rotates on an axis 107A by means of a roller bearings not shown, but understood by those skilled in the art. Axis 107A may be part of the drum partition 125 and the drum is attached thereto by a suitable connector 125A. Supported by the three inner bearings 103 at the open end 120E and three outer bearings 104 at the closed pulley end 120C, drum 120 can be rotated precisely by pulley 107 connected by a simple timing and drive arrangement 80 to a tractor wheel or another part of the tractor transmission.

The bearings allow the pulley 107 and drum 120 to rotate about the fixed partition 125. Support for the drum 120 is provided by inner bearings 103 mounted on sidewall 202 inside the drum 120 and outer bearings 108 mounted on the outside of sidewall 208 outside the drum 120. A hole 208A in the sidewall 208 of the case enclosure 200 allows the drum to be withdrawn and reinserted.

A divider plate or partition 125 divides drum 120 longitudinally into two separate, generally air tight vacuum and pressure chambers 160 and 180 respectively.

Although the partition 125 is shown in FIGS. 1–6 as advantageously dividing the drum interior longitudinally into about 180 degrees vacuum and 180 degrees pressure, it will be understood that the partition 125 may divide the drum into any other range of degrees so long as the vacuum is present to attract the seed S to and hold the seed S on the holding points 140 while the seed is moved from the seed supply 220 to a release point RP where, when it is released, it will proceed smoothly into the distribution system 300. Thus, as shown for example in FIG. 7. a divider partition 425 divides a drum embodiment 320 into about 330 degrees vacuum and 30 degrees pressure. With this 330/30 division, the seed S is held and positively controlled on the drum 320 for a longer time than in the 180/180 split.

The pressure in the pressure portion of 180 of drum 120 may be adjusted to propel the seed off holding point 140 more directly into the distribution conduits 340 whereby the speed of travel of the seed S may be accelerated as desired. This feature is especially useful for small, lightweight seeds that need more initial push to get them going.

Partition 125 is fixed at a first end 125A to the case end wall 218 on one side using suitable fasteners 153 as shown in FIG. 3 so that it does not move, even though the drum 120 itself rotates. Drum 120 projects through the hole 208A and in addition to support by partition 125 it is slidably supported by the hole around its circumference.

FIG. 6 is an enlarged view of one of the air seals 150 that is present on each of the opposite first and second side edges 125C and 125D of divider 125. Here seal 150 is shown on edge 125C biased outwardly toward and contacting the inner circumferential surface 120S of drum 120. A similar construction is provided on the end edge 218A.

Air seal 150 may be made of a thin flat piece of plastic 150A positioned in a slot 125E in the edges 125C and 125D of the drum partition 125. A resilient biasing means 124 in the slot 125E below the piece of plastic 150A urges the thin flat piece 150A against the drum inner surface 120S to provide a relatively airtight division between the vacuum and pressure halves of the drum.

FIG. 6 shows one inner bearing 103, some of the pick up points 140, and seeds S in transit. We have found it advantageous to make most parts of the invention of clear plastics, however, other suitable materials can be used as well.

A vacuum pressure source means such as a fan 127 mounted on the otherwise airtight divider 125 serves to generate a predetermined vacuum in the first chamber 160 and a predetermined pressure in the second chamber 180. The fan 127 is powered by a rotating means such as a motor 101 which we have found may advantageously be mounted on the divider 125. In this position the fan 127 draws air from and reduces the pressure in chamber 160 and forces air into and thereby increases the pressure in chamber 180. The power for motor 101 may conveniently be supplied by a 12 volt battery of the tractor 20 by suitable wires not shown.

In operation, the fan 127 may be rotated at a predetermined and variable range of speeds to blow air from the first suction chamber 160 into the second or discharge chamber 180. This produces a predetermined negative pressure at the seed holding points140 so that seeds will be attracted thereto on the first or suction chamber 160 side. In this arrangement the opposite occurs on the second or discharge chamber 180 side wherein the positive pressure at the seed holding points140 acts to release and force off seeds S being held at points 140. Because the divider 125 does not move, the suction chamber 160 and discharge chamber 180 remains stationary even as the drum 120 itself rotates.

As shown in FIGS. 3 and 3A, two valves 114 and 115, located on the sidewall of the machine enclosure 200 to which the drum partition is permanently attached, are connected to chambers 160 and 180 respectively to allow adjustment of air pressures within these chambers. Operation of the valves may be understood from a view of an enlarged valve 115, as shown in FIG. 3A, which includes the outer portion 115 surrounding and concentric with an inner portion 117 that is fixed to the sidewall 202 about an opening 118. Both valve portions 115 and 117 have an opening 115A and 117A respectively therein of a similar size and location whereby as rotatable portion 115 is rotated relative to fixed valve portion 117 the effective size of the openings 115A and 117A will vary from full open to fully closed thereby allowing regulation of the flow of air there through and varying the effective pressure in the vacuum and pressure sides 160 and 180. These valves may include a pressure meter. As an alternative to the simple fan arrangement 127, an air suction line and a pressure line can be connected to chambers 160 and 180 respectively to replace the motor and fan unit.

Figure 8:
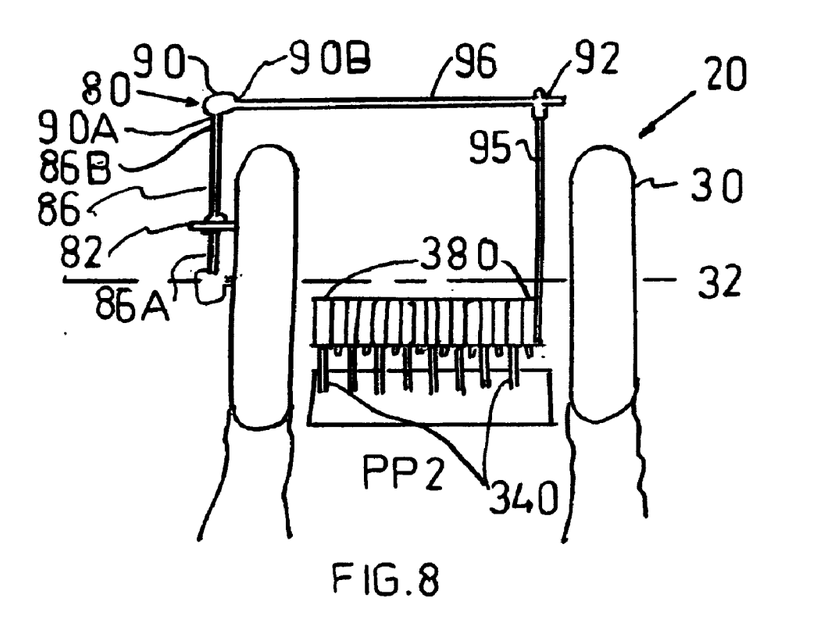
FIG. 8 is a rear view of another embodiment of the seed planting system of the invention showing the relationships between the seed selector, timing arrangement and distribution portions of the invention and wherein the seed selector is located just above the tiller arrangement; and, FIG. 8A is a perspective view of a seed selector drum as would be used in the embodiment of FIG. 8.
Figure 8A:
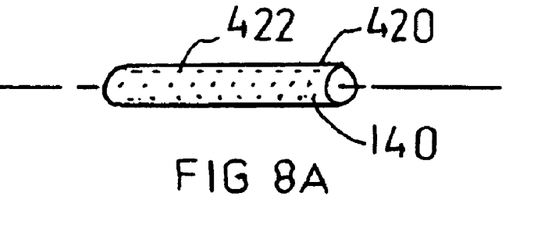

The power and timing mechanism 80, as may be understood form FIGS. 1 and 8, comprises a power take-off wheel 82 affixed to a first end 86A of a first transmission member 86. A second end 86B of member 86 is connected to a input side 90A of a change of direction gear 90. In practice it has been found that a 1:1 gear works effectively. An output side 90B of gear 90 has connected thereto a second transmission 96 which in turn is attached to a driving pulley 92 whereby rotary movement of tractor wheel 30 causes power take-off wheel 82 to rotate which in turn rotates first and second transmission members 86, 96 respectively through direction gear 90 and rotates driving pulley 92 at a speed directly proportional thereto. The belt 95 passing around the peripheries of drive pulley 92 and drum pulley 107 causes drum 120 to rotate at a speed directly proportional to the speed V of the tractor 20 over the ground G.

Flexibility is shown in the ability to vary the spacing between seeds in each row. Variation of the speed of rotation of the seed selector member drum 120 and hence the longitudinal spacing between seeds planted in each row in the ground is quickly, easily and reliably achieved by easily adjusting the position of the power take-off wheel 82 up and down radially on the first transmission member 86 whereby as wheel 82 moves toward the wheel axis 32, it effectively sees a smaller diameter and corresponding smaller circumference of wheel 30 and hence rotates more slowly and of course slows rotation of drum 120 relative to velocity V. Similarly, movement of the power take-off wheel 82 away from the wheel axis 32 increases the number of revolutions of the take-off wheel for each revolution of the tractor wheel 30 whereby the speed of the drum 120 increases. The higher speeds of drum 120 serves to effectively compress the predetermined pattern in a longitudinal direction so that the seeds are more closely spaced longitudinally than they would be at a relatively lower drum speed.

Although the speed of drum 120 and spacing of the seeds may be varied by moving the take-off wheel 82 along the first transmission member 86 closer to or further away from axis 32, once that location is set, the rotation of the drum 120 is related only to the forward speed of the tractor 20 so that the predetermined pattern longitudinal spacing between two seeds in a circumferential row CR is maintained regardless of the tractor speed.

Micro switches 111 and 112 are attached by a suitable fastener to case end wall 218 pulley 107 as may be best seen in FIGS. 3 and 5. Micro switch triggering mechanisms 136 are positioned at an appropriate point on the drum such as rotating pulley 107 at a point generally corresponding to each row of holding points 140 on the circumference of drum 120 to trigger the micro switches 111 and 112 and thereby generate an electrical pulse each time they are triggered. These electrical pulses can be used for control purposes such as, for example, to count the number of seeds planted and/or to control a fertilizing system so that the seeds may be simultaneously fertilized as they are planted, etc.

FIGS. 8 and 8A illustrate another embodiment wherein a seed selector 380 is of the construction and operation of seed selector 100, but is relatively elongated to extend generally across the width between the wheels 30 of tractor 20 and is located near the ground engaging portion or probes 45 of distribution system 300 so that the length of the distribution conduit 340 is shortened and allows the seeds S to drop more quickly and directly into the ground G by means of the same mechanism and method as shown in FIGS. 1–7. Drum 420 having an outer surface 422 and seed holding points 140 is an example of a drum used in selector 380.

According to the method of operation for accurately and efficiently planting a plurality of individual seeds for different crops and planting conditions in a predetermined pattern PP with the seeds S each accurately spaced along rows accurately spaced apart in ground soil by means of a seed planting system adapted to move over the ground soil comprises the steps of (a) providing a case 200 including (i) a compartment 220 adapted to contain a supply of loose seeds S to be planted, (ii) a seed distribution arrangement 300 for moving the seeds to the soil G. (iii) a drive 80 to move said continuous surface, (iv) vacuum source 160, (v) a pressure source 180, (vi) a support 125 for a movable continuous surface 122 between and adjacent both said supply of seeds SS and said seed distribution arrangement 300 as well as between and adjacent said vacuum and pressure sources 160, 180 respectively;

(b) selecting one from a plurality of continuous surfaces as shown for example at 120, 221 each having their seed holding points 140 in a different predetermined array or pattern PP1, PP3, respectively;

(c) installing said selected continuous surface 120 or 221 on said support 125 in said case 200 so that said seed holding points 140 are adapted to be adjacent said compartment 220 when said seed holding points are in communication with said vacuum source 160 and until said seed holding points 140 are in communication with said pressure source 180 adjacent said distribution arrangement 300;

(d) placing a supply of selected seeds S of a predetermined range of size and shape into the seed supply chamber 220 in which they are juxtaposed to the continuous surface 122 and its plurality of seed pick up points 140 arranged in a predetermined array PP1 or PP3 or pattern unique to the size and shape and/or spacing of seeds S;

(e) moving said selected continuous surface 120 with said seed holding points 140 adjacent said supply of seeds SS so that said seeds are sequentially attracted to and held by each of said seed holding points 140;

(e) holding said individual seeds in said first predetermined pattern on said continuous surface while (i) said continuous surface 122 moves to said distribution arrangement 300 and (ii) said transport 20 moves over said ground;

(f) sequentially releasing the seeds S held on said surface 122 into said distribution arrangement 300 in said predetermined pattern PP1 or PP3 for movement to the ground soil G and for a change of scale so that the second predetermined pattern PP2 planted in the ground is of a different scale than the first predetermined pattern PP1 or PP3 on said surface 122.

The method includes the steps of selecting seeds from a seed supply SS in a first predetermined pattern PP1 on a continuous circumferential surface 122 which pattern PP1 has a predetermined number of seeds, as shown in FIG. 2B, in a first predetermined circumferential spacing PCS in a circumferential row CR and a plurality of laterally related circumferential rows LCR; moving the continuous surface 122 to a distribution arrangement 300 while said continuous surface 122 is moving over the ground and sowing the seeds S into the ground through the distribution arrangement in a scaled version PP2 of said first predetermined pattern PP1 regardless of the rate of speed of movement over the ground. It also includes the step of adjusting the position of drive wheel 82 that provide power for moving said continuous surface 122 over the ground to change the scale of the circumferential spacing PCS in the ground pattern PP2 as shown in FIG. 1.

Figure 7:
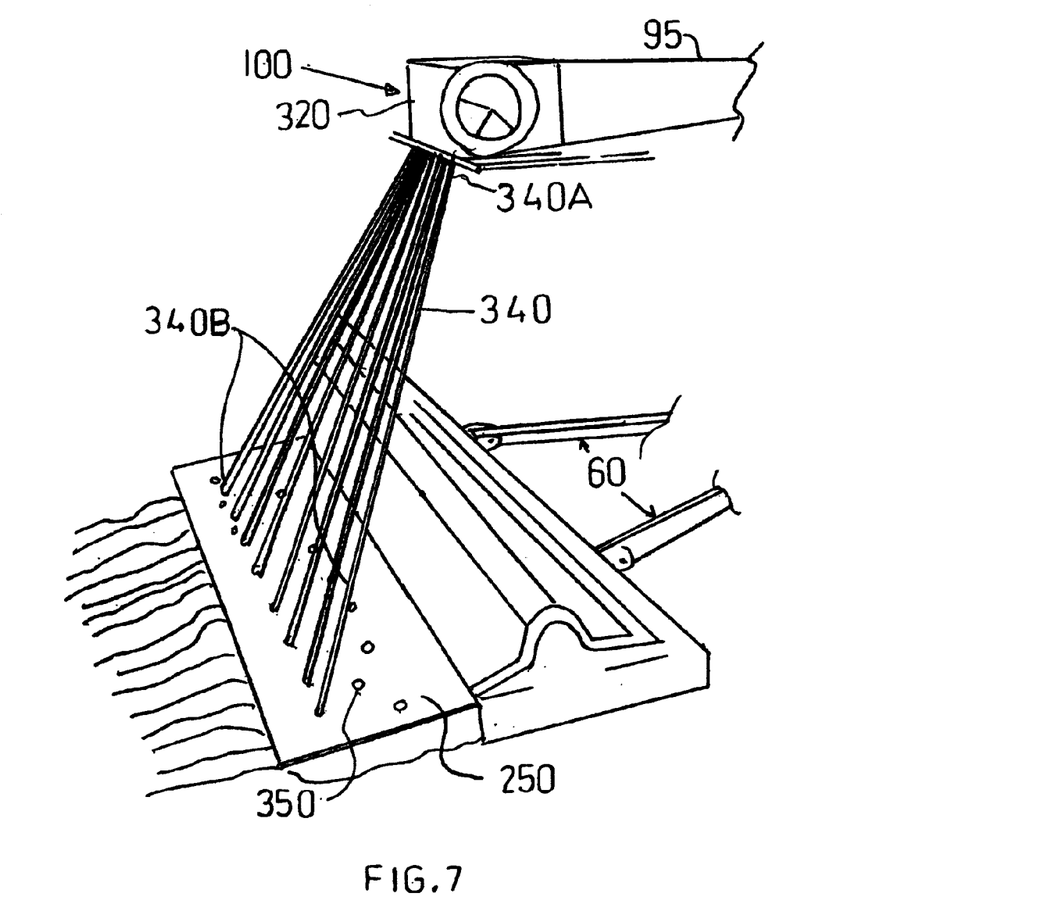
FIG. 7 is a schematic elevational perspective view of another embodiment of the distribution system as used with a tiller arrangement.

Another aspect of the method is planting a plurality of different seeds S1, S2 in adjacent circumferential rows CR including the steps of providing a plurality of seed holding compartments 220A and 220B each holding different seeds S1, S2 to be planted as shown in FIG. 3 and arranging the distributor 300 conduits between fittings 335 and furrow producing probes 45 seen in FIG. 1 and/or openings 350 seen in FIG. 7 wherein the probes are below a cover 250.

Another step to the method includes adjusting the pressure in the vacuum and pressure portions 160, 180 by means of adjustment valves 114 and 115 respectively wherein a greater or lesser amount of ambient air may be made available to those portions by rotating the valves as shown for example in FIG. 3A to increase or decrease the openings 115A and 117A.

A further step includes varying the patterns and spacing of the rows planted in the ground includes placing the inlet ends 340A of conduits 340 on various predetermined outlet fittings 335 and fitting the outlet ends 340B from various of these conduits 340 to various of the probes 45.

As shown, the continuous surface 122 may take the form of a drum 120 and the pick up points 140 may take the form of a predetermined pattern of holes PP1 in the continuous surface. The seed holding pick up point 140 is configured for the preselected seed or seeds S that are to be planted. The seed holding points 140 are holes 142 arranged in a predetermined pattern PP on the outside continuous surface 122 which is a scale of the pattern in which they are to be placed in the ground. The array or pattern of seed holding points 140 are arranged in a matrix of circumferential rings CR and longitudinal rows LR of holes which rings and rows are spaced apart a predetermined distance along the axial length and circumference of the drum 120 wherein in operation each ring CR and LR provides the seeds to a corresponding a row. The number of circumferential rings CR determines the maximum number of rows of seeds S that can be planted simultaneously in one pass of the system 10.

As the array of points 140 on continuous surface 122 moves past the seed supply SS each of the pick up points 140 is in communication with vacuum source 160 so that the pick-up point 140 attracts a seed S from the supply chamber 220 and holds it against the surface 122. As the continuous surface 122 rotates or moves, the seed moves with it. After the seed S travels past the point where the pick-up point 140 is in communication with the vacuum side 160, it reaches the release point RP where the pick-up point 140 is in communication with the pressure side 180 and at this position the air under pressure passes out through the seed holding point 140 and forces the seed S away from the seed holding pick up point 140 and off of the continuous surface. From this point the seed S passes under the force of gravity and/or the air pressure into a distribution channel 345 including the release chamber 310 and conduit 340 and on to the ground soil G. As shown in FIG. 1, the planting medium is ground soil G in which a furrow or furrows F have been formed by a furrowing member or probe 45 and the seed S is deposited by the outlet end 340B of conduit 340 in the furrow F and covered by ground soil G pushed over it by rollers 50 or other means such a plate 250 shown in FIG. 7.

Additional materials such as fertilizer or other material in liquid, granular or pellet form suitably carried by the transport apparatus 20 in means such as hoppers which are not shown, but which, as will be understood by those skilled in the art, may be mounted to feed materials with or adjacent to the seeds S at or before the time they are covered with ground soil G.

The invention herein provides a simple, flexible and efficient planting system and method that allows a specified predetermined seed or seeds S to be reliably picked out of a large supply of seeds SS and planted in exact predetermined pattern which is shown to include pitch spacing along each of a plurality of rows and the rows to be exactly spaced laterally apart a predetermined distance from each other for optimum growth and production.

The invention allows growers to produce a maximum amount of agricultural products efficiently in a minimum required growing area and at a very low total cost by being able to easily and reliably plant individual seeds S exactly spaced a predetermined pitch or distance apart along each row with each row exactly spaced apart laterally a predetermined distance whereby multiple rows of exactly spaced seeds S are quickly planted in the ground soil G at one time Moreover, with the technology that may be inherently incorporated in the equipment and method of the invention, improved planting may be easily achieved in developing countries and/or where there is a lack of skilled labor and agricultural knowledge.

Although described for purposes of understanding with respect to specific preferred apparati and methods, the present invention is not limited to those embodiments, but rather is applicable broadly to all versions of the invention falling within the scope and spirit of the appended claims.

I claim:

1. A flexible seed planting system quickly changeable to sequentially plant different types of crops in ground soil comprising a seed selector and a seed distributor;

said seed selector including a changeable selector member in the form of a rotatable cylindrical drum, said drum having a hollow interior and a continuous outer surface, said outer surface having seed holding points, said seed holding points arranged in a predetermined array, said seed holding points individually being capable of holding a predetermined seed or seeds and collectively being capable of (a) sequentially selecting a predetermined array of seeds from a seed supply and (b) holding said selected seeds in said array while sequentially moving said seeds circumferentially to a release point where said seeds are adapted to sequentially leave said seed holding points and enter said seed distributor wherein said seeds are adapted to be conveyed to a point where they are sequentially planted in ground soil in a scaled version of the predetermined array of said seed holding points;

a fixed partition in said hollow interior of said drum dividing said hollow drum interior into a vacuum portion and a pressure portion, said seed holding points including an opening in said continuous outer surface that extends through to said drum interior, said openings communicating with said drum interior, said drum interior having said vacuum portion in the area (i) adjacent said seed supply where said seed holding points are adapted to select said predetermined array of seeds from said seed source and (ii) in the area where said seeds are adapted to be sequentially moved circumferentially to said release point; and said drum interior having said pressure portion in the area of said release point where said seeds are adapted to be sequentially released from said seed holding points and into said seed distributor.

2. A seed planting system according to claim 1 wherein said openings in said seed holding point openings comprise a first portion on said outer surface and a second portion interior thereof, said first portion being of lesser axial length and smaller cross-section area than, said second portion being of longer axial length and of larger area.

3. A seed planting system according to claim 2 wherein said openings in said seed holding point includes two first portions and a single second portion.

4. A seed planting system according to claim 1 wherein said seed selector includes a case, said case having therein:
(i) a seed supply chamber to provide said seed source, (ii) said drum, (iii) said fixed partition and (iv) an inlet portion of said seed distributor;
said drum being positioned between said seed supply chamber and said inlet portion of said seed distributor and being mounted on said fixed partition, said drum being rotatable about said fixed partition.

5. A seed planting system according to claim 4 wherein said drum has (i) a closed end wall on one end; (ii) an interior surface defining the drum interior including an inner cylindrical surface generally parallel to said continuous outer surface and an inner surface of said closed end wall and (iii) an open end;
said case having a case end wall, said fixed partition being fixed on said case end wall, said open end of said drum being adjacent said case end wall and forming a generally air tight seal therewith, said fixed partition being in said drum interior and forming an airtight seal with the interior surface of said drum to divide said drum interior into first and second compartments, said first compartment adapted be said vacuum portion and said second compartment adapted to be said pressure portion.

6. A seed planting system according to claim 5 wherein said fixed partition of said drum has an opening therein with a fan mounted over said opening, said fan being operable to pull air from said first compartment on a first side of said partition to create a vacuum therein and to blow air into said second compartment to create pressure therein.

7. A seed planting system according to claim 5 wherein said first and second compartments each have pressure adjustment devices communicating with ambient air to allow adjustment of the vacuum and air pressures therein.

8. A seed planting system according to claim 5 wherein said drum is held on said partition support by a connector operable to connect or disconnect said drum from said support whereby said drum rotates on said fixed support and may be freely disconnected and removed therefrom.

9. A seed planting system according to claim 5 wherein said drum is driven by a power and timing device connected to a drive wheel of said transport whereby said drum rotates in response to movement of said transport.

10. A seed planting system according to claim 4 wherein said seed supply chamber has a bottom plate and sides to allow said chamber to contain the seed supply source, said bottom plate being inclined downwardly toward said drum and having a first edge adjacent the drum outer surface, said bottom plate being movable away from and toward said drum outer surface whereby seeds in said seed supply chamber may quickly flow out of said chamber to empty said chamber and recover the seeds when said bottom plate is moved away from said continuous surface.

11. A seed planting system according to claim 10 wherein a funnel arrangement is located at the first edge of said bottom plate whereby any seeds falling over the first edge are directed by said funnel arrangement.

12. A seed planting system according to claim 11 wherein said funnel arrangement is hinged to said bottom plate adjacent said first edge so that regardless of how far or how fast said bottom plate is moved away from said continuous surface, the funnel arrangement is always in the place to recover the seeds.

13. A seed planting system according to claim 10 wherein each of said sides of said seed supply has a guide therein, said bottom plate having side edges generally perpendicular to said first edge, said side edges being slideably received in said guides of said sides.

14. A seed planting system according to claim 4 wherein said seed supply chamber is positioned adjacent said drum outer surface and extends along the axial length of said drum, said seed supply having partitions generally perpendicular to said drum axis, said partitions having first edges curved and abutting said continuous outer surface to divide said seed supply into compartments, each of said compartments being adapted to hold different seeds to be planted is said ground soil.

15. A seed planting system according to claim 1 wherein said selector drum is driven by a power source connected through a timing mechanism to a speed variable portion of a transport apparatus whereby the seed selector turns at a rate proportional to the speed of the transport apparatus whereby the seeds are deposited in the same scaled pattern regardless of the speed of the transport apparatus.

16. A seed planting system according to claim 15 wherein said transport apparatus moves on a wheel and said timing mechanism comprises a power take off wheel in rotatable contact with said wheel on said transport apparatus, said power take off wheel being adjustable along the radius of said transport wheel to vary the pitch spacing between seeds.

17. A seed planting system according to claim 1 wherein said seed holding points are positioned about the circumference of said drum in rows located generally in a plane perpendicular to the axis of said drum, said distributor including a series of distribution channels at least equal in number to the number of rows arranged to receive seeds as they are sequentially released from said seed holding points, said distributor channels adapted to direct the seeds to ground soil to be planted.

18. A seed planting system according to claim 17 wherein said distributor channel includes flexible conduits having a first seed receiving inlet end and a second seed dispensing end, said dispensing end being held in a first predetermined position on said system adjacent said ground soil, said seed dispensing ends being movable as required to achieve the placement of the seeds in the predetermined array.

19. A method of accurately planting a plurality of individual seeds for different crops and planting conditions with the seeds each accurately spaced along rows accurately spaced apart in ground soil by means of a seed planting system adapted to move over ground soil comprising the steps of:

(a) providing a case including (i) a compartment adapted to contain a supply of loose seeds to be planted, (ii) a support for a movable continuous surface adjacent said supply of seeds, (iii) a seed distribution means, (iv) a drive for said continuous surface, and (v) a vacuum and pressure source, (b) selecting one from a plurality of continuous surfaces each having different seed holding points in a predetermined pattern;

(c) installing said selected continuous surface on said support in said case so that said seed holding points are in communication with said vacuum source as said seed holding points are adjacent said loose seeds to be planted as well as during movement of said continuous surfaces toward said seed release point and in communication with said pressure source when said seeds are at said seed release point, (d) moving said selected continuous surface with said seed holding points adjacent said supply of loose seeds so that said seed holding points sequentially select individual seeds from said supply of seeds in said predetermined pattern, (e) holding said individual seeds in said predetermined pattern on said continuous surface while said continuous surface moves a predetermined distance with said seeds, (f) sequentially releasing the predetermined pattern of held seeds into a distribution arrangement for movement to the ground soil, (g) sequentially moving the distribution arrangement over the ground soil, and (h) selecting the seeds in a predetermined pattern and moving the continuous surface with the held seeds thereon at a rate coordinated with the rate of movement of the distribution arrangement over the ground soil whereby the seeds are sown in the ground soil in a scaled version of said predetermined pattern regardless of the rate of speed of movement over the ground.

20. A method planting seeds according to claim 19 wherein a plurality of different seeds for different crops may be planted in adjacent rows at the same time including the further steps of;

(i) providing a plurality of seed holding compartments each holding different seeds to be planted;

(j) selecting a continuous surface having seed holding points of the type to select and convey the different types of seeds for each row of seeds to be planted;

(k) arranging the distributor to distribute the various seeds in the predetermined rows.

21. A method of planting seeds according to claim 20 including the further step of adjusting the vacuum force to optimize the seed holding force of the vacuum at each seed holding point for the specific type and size of seed to be planted.

22. A method of planting seed according to claim 20 wherein the system includes a ground engaging furrow producing probe and the distribution arrangement includes seed selector outlet fittings and conduits from the seed selector to the probes, said method including the step of arranging the predetermined pattern planted in the ground by by connecting the conduits between various predetermined outlet fittings and various probes.

* * * * *